US012706844B2

(12) United States Patent
Andersson et al.

(10) Patent No.: US 12,706,844 B2
(45) **Date of Patent: *Aug. 11, 2026**

(54) ASYMMETRIC DELAY COMPENSATION

(71) Applicant: Net Insight AB, Solna (SE)

(72) Inventors: Michael Andersson, Österskär (SE); Magnus Danielsson, Stocksund (SE); Per Lindgren, Strängnäs (SE)

(73) Assignee: Net Insight AB, Solna (SE)

( * ) Notice: Subject to any disclaimer, the term of this patent is extended or adjusted under 35 U.S.C. 154(b) by 160 days.

This patent is subject to a terminal disclaimer.

(21) Appl. No.: 18/696,141

(22) PCT Filed: Sep. 28, 2022

(86) PCT No.: PCT/EP2022/076933
§ 371 (c)(1),
(2) Date: Mar. 27, 2024

(87) PCT Pub. No.: WO2023/052396
PCT Pub. Date: Apr. 6, 2023

(65) Prior Publication Data

US 2024/0396836 A1 Nov. 28, 2024

(30) Foreign Application Priority Data

Oct. 1, 2021 (SE) .................................... 2151211-6

(51) Int. Cl.
*H04L 45/76* (2022.01)
*H04L 43/0864* (2022.01)
(Continued)

(52) U.S. Cl.
CPC .......... *H04L 45/76* (2022.05); *H04L 43/0864* (2013.01); *H04L 47/125* (2013.01); *H04L 47/18* (2013.01)

(58) Field of Classification Search
None
See application file for complete search history.

(56) References Cited

U.S. PATENT DOCUMENTS 6,711,411 B1 3/2004 Ruffini
7,602,873 B2 * 10/2009 Eidson .................. H04J 3/0667 375/358

(Continued)

FOREIGN PATENT DOCUMENTS

EP 1802014 A1 6/2007
EP 3382918 A1 10/2018

(Continued)

OTHER PUBLICATIONS

Swedish Search Report For Swedish Patent Application No. 2151211-6 dated Jun. 9, 2022.

(Continued)

*Primary Examiner* — Fadi Haj Said
(74) *Attorney, Agent, or Firm* — Harness, Dickey & Pierce, P.L.C.

(57) ABSTRACT

There is provided an asymmetric link delay compensation method in which a plurality of calibration profiles maybe used for providing a common network time estimate in a communication network. The communication network comprises a node at least two virtual paths, VP, connecting to one or more sync nodes. The at least two VPs are each associated with one or more respective predetermined calibration profiles with a respective delay correction factor. By identifying which of the VPs may be candidate VPs for calculating a time offset caused by the delay over the VPs and then ranking the candidates to select a best or a set of candidates for the calculation, an advantageous method for providing a common network time in the communication network is achieved.

19 Claims, 4 Drawing Sheets

(51) Int. Cl.
*H04L 47/10* (2022.01)
*H04L 47/125* (2022.01)

(56) References Cited

U.S. PATENT DOCUMENTS

| | | | | |
|---|---|---|---|---|
| 9,172,485 | B2 * | 10/2015 | Mizrahi | H04J 3/0667 |
| 9,628,210 | B1 | 4/2017 | Zampetti | |
| 2010/0329125 | A1 * | 12/2010 | Roberts | H04J 3/0667 370/503 |
| 2011/0122775 | A1 * | 5/2011 | Zampetti | H04L 45/121 370/242 |
| 2016/0173352 | A1 * | 6/2016 | Danielsson | H04L 63/1408 370/252 |
| 2018/0048409 | A1 | 2/2018 | Mizrahi | |
| 2022/0094627 | A1 * | 3/2022 | Chen | H04L 45/24 |
| 2022/0321488 | A1 * | 10/2022 | Colonna | H04L 47/283 |
| 2023/0195161 | A1 * | 6/2023 | Shiga | H04J 3/0667 713/400 |

FOREIGN PATENT DOCUMENTS

| | | | |
|---|---|---|---|
| WO | 2013/117997 | A2 | 8/2013 |
| WO | 2020129701 | A1 | 6/2020 |
| WO | 2020154199 | A1 | 7/2020 |

OTHER PUBLICATIONS

International Search Report for International Application No. PCT/EP2022/07693 dated Nov. 29, 2022.

International Preliminary Report on Patentability for International Application No. PCT/EP2022/076933 dated Dec. 20, 2023.

* cited by examiner

ASYMMETRIC DELAY COMPENSATION

CROSS-REFERENCE TO RELATED APPLICATIONS

This application is a national phase under 35 U.S.C. § 371 of PCT International Application No. PCT/EP2022/076933 which has an International filing date of Sep. 28, 2022, which claims priority to Swedish Application No. 2151211-6, filed Oct. 1, 2021, the entire contents of each of which are hereby incorporated by reference.

TECHNICAL FIELD

The present invention relates to the field of communication network systems for node-to-node transmission of data and time synchronization, and more particularly to a method for providing a common network time estimate in a communication network.

BACKGROUND OF THE INVENTION

The need for providing accurate time and frequency synchronization in communication networks is increasing in many industries, including, media, finance, automation, power grids and mobile networks, but also in many other areas. A common way for providing such accurate time and frequency synchronization is by obtaining accurate clocks from GPS and other GNSS systems directly into nodes in the communication network. However, there are also many protocols for delivering time synchronization over terrestrial optical, microwave links, Ethernet, MPLS and IP networks using protocols such as Network Time Protocol (NTP), IEEE1588 (PTP) and other proprietary Time Transfer solutions.

These terrestrial protocols are based on so called two-way time transfer methods measuring individual link delays based on local clocks and the Round-Trip Time (RTT) to calibrate the local clocks link by link. However, most such protocols assume that the link delay is equal to RTT/2 and have difficulties to handle asymmetric delays, i.e., where the delay from a first Node A to a second Node B is different than the delay from the second Node B to the first node A. If this is a static delay this can be calibrated and handled thereafter. However, asymmetry may also occur dynamically during operation and is something that breaks many two-way time transfer protocols and thus there is a need to at least improve the ability of handling such asymmetry of delays.

SUMMARY OF THE INVENTION

It would be advantageous to provide an at least improved and reliable method for handling dynamically changing and asymmetric link delays in two-way time transfer based communication systems. This object is achieved by a method according to the present invention as defined in the independent claim 1.

To identify that the properties of the links between two sync nodes do not change, calibration profiles can be used comprising or being associated with a sort of identifier of the path and a delay correction factor to compensate for the asymmetry when performing two-way time transfer calculations which typically all assume symmetric delays. This invention makes use of calibration profiles but in the concept of a whole network comprising multiple paths between nodes in a network, identifying and selecting best paths and calibration profiles. The invention also provides methods to ensure that all paths between sync nodes on the way from the clock source to end sync node are using links with accurate calibration profiles.

Thus, in a first aspect of the present inventive concept, there is provided a method for providing a common network time estimate in a communication network comprising a node having at least two virtual paths (VP) connecting to one or more sync nodes. The VPs are preferably associated with at least one respective calibration profile which comprises a respective delay correction factor.

The method comprises identifying candidate VPs among the at least two VPs, selecting one or more candidate VPs by ranking them, and calculating at least one time offset based on the calibration profiles of the one or more selected VPs. Thereby, if more than one connected VPs are detected by or for the node, which are identified as potential candidates for providing a trustworthy delay correction factor to use when providing time offset estimates in the node, the ranking advantageously provides a selection mechanism between the candidate VPs.

According to an embodiment, the method further comprises determining if connected sync nodes of VPs are in calibrated state, and determining if the node is in a calibrated state, which is advantageous.

According to an embodiment, the step of determining if the node is in a calibrated state comprises identifying if a connected sync node of at least one selected VP is in a calibrated state and determining that a selected calibration profile of the selected VP is in a calibrated state. This is advantageous.

According to an embodiment the method further comprises communicating calibrated state of the node to neighboring nodes, which is advantageous to distribute the calibrated state throughout the network and thus ensures that each step (VP) from a clock source via each sync node to a receiving node is in a calibrated state and thus the calculated time over such VPs is done over calibrated paths and nodes from the clock source, using accurate delay correction factors in each hop. This is essential to ensure correct estimated time calculation in the node.

According to an embodiment the step of identifying candidate VPs comprises determining if data stream characteristics and/or link path properties of the VPs match to their respective calibration profiles. This may include monitoring metrics and comparing to corresponding values in (at least one) calibration profile with some predetermined tolerance, and if matching the calibration profile, the VP is considered to be in a calibrated state. Data stream characteristics may thus be monitored and matched against their respective calibration profiles within a preset range, and thus a dynamic link calibration profile variance is monitored.

According to an embodiment the step of identifying candidate VPs comprises determining if the data stream characteristics and/or link path properties match their respective calibration profiles within a preset range. The monitoring of the data stream characteristics may be continuously performed such that threshold may be set to detect changes outside of an acceptable range which indicates that the VP is no longer calibrated. This is advantageous to be able to dynamically handle changes in the network. Using multiple characteristics and properties is preferable since it makes the system more reliable to detect a change and corresponding asymmetry error.

According to an embodiment, the method further comprises determining if connected sync nodes of VPs are in calibrated state.

According to an embodiment, the ranking is performed by at least one of comparing among identified candidate VPs: if the respective connected sync node is in calibrated state, best fit or weighted best fit of data stream characteristics of the respective calibration profile, link type or link path properties (e.g. up time, time in calibrated state, robustness), master clock source (e.g. identity, class, best path to highest priority master clock source), priority of master clock source, quality metrics of the VPs and/or their combined path to master clock source, sync routing protocol metrics from (e.g. a highest priority) master clock source per VP, calculated node clock time per VP (e.g. selecting the best calculated node clock per path or comparing individual values to a mean value), and number of link paths to connected sync node or to master clock source.

The ranking between candidate VPs may thus be performed by comparing predetermined values of their respective calibration profiles with each other and/or comparing to corresponding monitored values of the respective VP. Here the predetermined value may correspond to e.g. one or more system characteristics, link path characteristics, QoS metrics, Sink source quality, stream characteristics such as Packed Loss, Packet Delay Variation (PDV), the underlying networks, e.g. Optical, Managed IP, Unmanaged IP, underlying network configuration such as type of traffic engineering or traffic class, e.g. Expedited Forwarding (EF), Assured Forwarding (AF), underlying network: number of underlying sync hops from sync source, sync network: number of managed sync hops from source, local clocks, or some combination thereof. When ranking (and prioritizing which VPs to select) based on link type, the link type may be one of fiber, Ethernet, IP/MPLS, radio link, OAS, mobile link, and Internet.

Comparing link characteristics and QoS metrics comprises e.g. monitoring packet loss and ranking the VP with the lowest packet loss highest at selection of candidate VPs, monitoring packet delay variation and ranking the VP with the lowest jitter highest at selection of VP, or monitoring some combination of several QoS metrics and ranking based on the combined metrics.

According to an embodiment, when comparing sync routing protocol metrics, the method comprises comparing path length to a highest priority source clock, that is the number of link paths or link hops and/or link quality metrics are utilized in the ranking. For instance, when ranking VPs, the one with the lowest number of sync hops to a highest priority source clock, and/or best link quality metrics will be highest ranked.

According to an embodiment, the method further comprises calculating at least one node clock time by using at least one of the time offsets as a time correction factor.

According to an embodiment, the node clock time is calculated using an average of at least two of the time offsets as a time correction factor. Alternatively, the node clock time is calculated as a mean value of the respective node clock times calculated based on a multiple of different selected VPs, e.g. through an average, median, or similar algorithm.

According to an embodiment, the calculating of at least one node clock time comprises applying weighting factors on the node clock times or the time offsets. The weighting factors may be based on e.g. QoS metrics monitored for the respective VP, link type, number of link hops and/or link quality metrics or other ranking factors. The ranking factors may be selected from a priority subset of candidate VPs and selecting parameters.

According to an embodiment, when a ranking factor is link type, the link type is one of fiber, IP wavelength, Ethernet, IP/MPLS, radio (mobile and microwave) link, OAS, and Internet.

According to an embodiment, the calibration profiles are identified in a list of predetermined calibration profiles by monitoring and comparing at least one monitored data stream characteristics and/or at least one link path property to corresponding values of the respective predetermined calibration profiles.

The monitoring and ranking the VPs, may be performed locally at each node, or provided as a centralized protocol performed at a central node.

According to an aspect of the inventive concept, there is provided a central node in a communication system, wherein the central node is arranged in communication with a multiple of sync nodes, and arranged for performing the method described herein provided as a central protocol such that the central node in communication with the sync nodes performs the steps of the method. Hybrid models are possible where preferably the actual time stamping, link characteristics monitoring, and time calculations are performed in the local sync nodes, but the results are sent to a centralized compute module to perform the ranking, comparison and selection of VPs and calibration profiles.

According to an aspect of the inventive concept, there is provided a node in a communication system arranged for node to node communication, the node comprising: a memory storing computer-readable instructions, and a processor configured to execute the computer-readable instructions to a method according to any preceding claim. It may further comprise means for transmitting the outgoing data stream, e.g. a transmitter.

According to an aspect of the inventive concept, there is provide a non-transitory computer readable storage medium storing computer-readable instructions executable by a processor to cause the processor to perform the method according to the disclosed inventive method.

In a communication system arranged for node to node communication, the node comprises a memory storing computer-readable instructions, and a processor configured to execute the computer-readable instructions to a method according to the present inventive concept.

Embodiments of the present inventive method are preferably implemented in a distribution, media content provider, or communication system by means of software modules for signaling and providing data transport in form of software, a Field-Programmable Gate Array (FPGA), an Application Specific Integrated Circuit (ASIC) or other suitable device or programmable unit, adapted to perform the method of the present invention, an implementation in a cloud service or virtualized machine (not shown in diagrams). The software module and/or data-transport module may be integrated in a node comprising suitable processing means and memory means, or may be implemented in an external device comprising suitable processing means and memory means, and which is arranged for interconnection with an existing node. The node may be arranged at an edge node, e.g. in communication with a streaming edge server, or is integrated in/or constitutes a streaming edge server.

Further objectives of, features of, and advantages with, the present invention will become apparent when studying the following detailed disclosure, the drawings, and the appended claims. Those skilled in the art realize that different features of the present invention can be combined to create embodiments other than those described in the following.

BRIEF DESCRIPTION OF THE DRAWINGS

The above will be better understood through the following illustrative and non-limiting detailed description of preferred embodiments of the present invention, with reference to the appended drawings, where the same reference numerals will be used for similar elements, and wherein.

All the figures are schematic, not necessarily to scale, and generally only show parts which are necessary in order to elucidate the invention, wherein other parts may be omitted or merely suggested.

DETAILED DESCRIPTION OF PREFERRED EMBODIMENTS

The invention is especially useful when transferring time between two sync nodes across a path with many underlying network nodes (e.g., routers, switches, radio link systems or optical transport nodes) that are not time sync aware. These intermediate non-sync aware nodes will add static and dynamic delays which often results in asymmetrical delays as stated above. In this invention we call the end-to-end path between the sync nodes virtual path (VP), and the different paths through the intermediate nodes link paths (LP). Different LPs will typically generate different asymmetries, which in normal two-way time transfer solutions will create time offsets from the correct time. It is also important to know and verify that the other sync node and the chosen VP(s) are in a calibrated state, so that the time stamps sent for the two-way time transfer protocol has been correctly calculated using time offsets to compensate for asymmetry errors in previous paths as well as for chosen VP(s).

Figure 1:
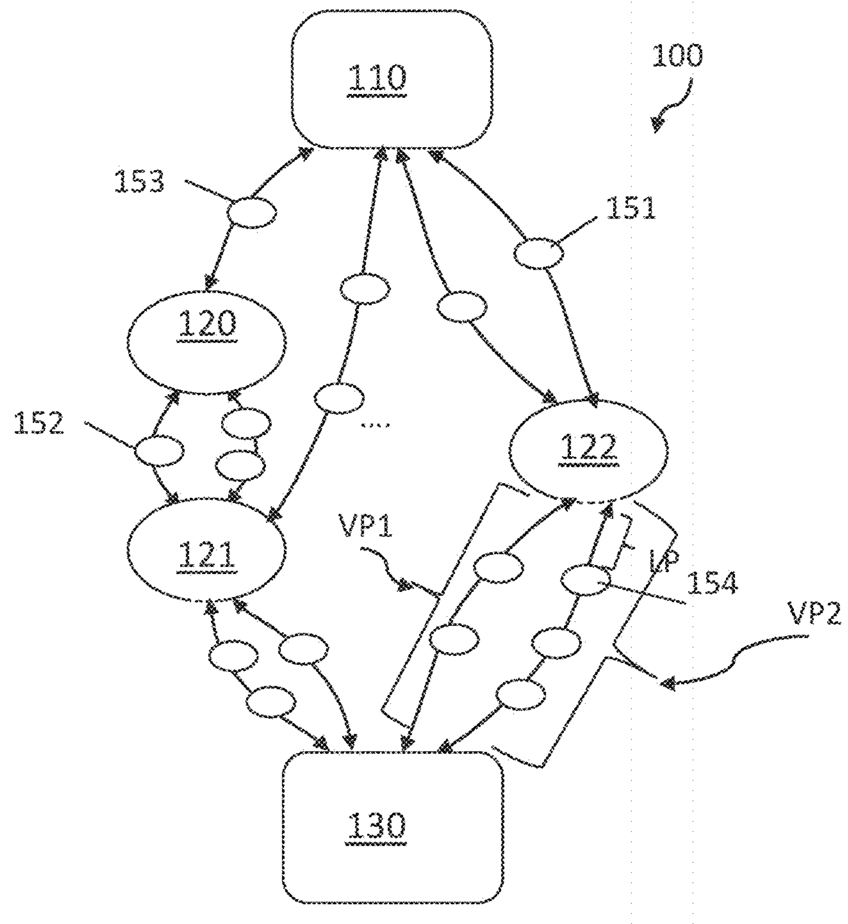
FIGS. 1 and 2 are schematic block diagrams illustrating a communication network in view of which aspects and embodiments according to the inventive concept is explained.

Referring now to FIG. 1, which is a block diagram schematically illustrating a communication network system 100 of e.g. IP type for any type of distribution of data, e.g. mobile data or media content, in view of which aspects of the present inventive concept will be described. It should be noticed that other types of networks, e.g. terrestrial optical, microwave links, Ethernet, MPLS and IP networks using protocols such as Network Time Protocol (NTP), IEEE1588 (PTP) and other proprietary Time Transfer solutions are also applicable within the present inventive concept.

The communication network system 100 comprises a multiple of nodes of three basic node types: clock source nodes 110, sync nodes 120, 121, 122 and other (intermediate) network nodes 151, 152, 153, 154 with are typically non-synch capable. The clock source node 110 provides a master timing signal distributing it over the network 100 to the sync nodes 151-154 via a network time protocol typically using two-way time transfer protocols between the sync nodes. It is possible to have several independent clock source nodes all providing a common clock source by means of a primary reference clock such as a GPS timing signal 140, GLONASS, Galileo or other sources of precise time. The nodes in the communication network system 100 are interconnected via two types of paths: virtual paths (VP) between two sync nodes, and link paths (LP) which interconnect network nodes of any type. In FIG. 1 two exemplifying virtual paths VP1 and VP2 have been indicated which both interconnect sync node 122 and sync node 130. A link path LP is illustrated between node 154 and sync node 122. Note that two different VPs can terminate on a same physical network port or on two different physical ports which means that when a bidirectional connection is set up between two sync nodes, the bidirectional connection can take different paths over different intermediate nodes for uplink and downlink traffic.

Figure 2:
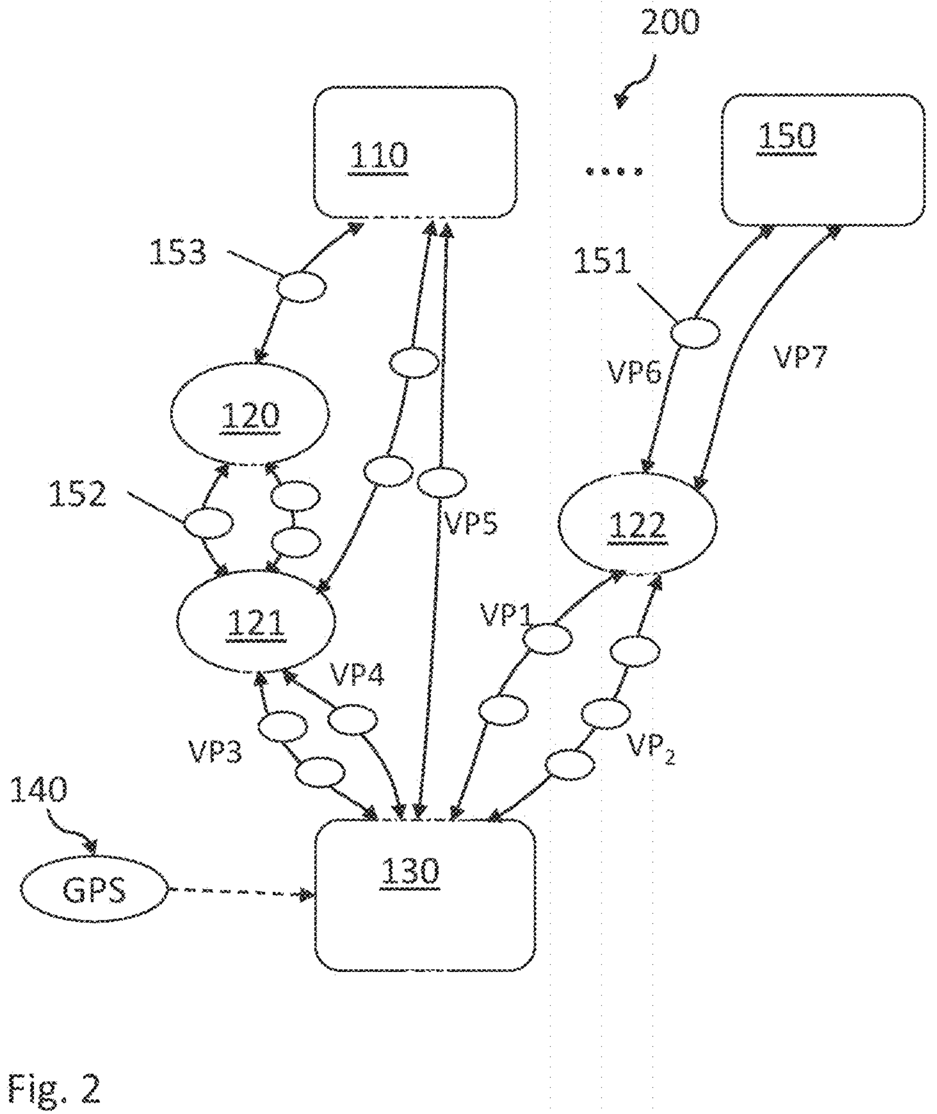

In FIG. 2 a block diagram schematically illustrating a communication network system 200 is shown. As previously mentioned, different network synchronization methods and protocols may be used to transfer time and frequency in the network such that the master timing signal is distributed from master to slave through the network, e.g. from the master: clock source 110, to slave: sync node 130 over a virtual path VP5 between clock source 110 to sync node 130. To continue with reference to FIG. 2, in which the communication network system 200 is illustrated, sync node 130 now have two available clock source nodes 110 and 150, which are reachable over a number of different VPs. The VPs may be connected directly to the clock source as illustrated for VP5, or be connected to intermediate sync nodes, e.g. sync node 122 to which VP1 and VP2 connects sync node 130. Virtual paths VP6 and VP7 respectively connect sync node 122 to clock source 150. In addition sync node 130 is optionally connected directly to a reference clock, GPS clock 140. The GPS clock can be used for calibration or for redundancy to using the network to distribute a common time from the master clock source(s). The system and methods are independent of GPS to distribute an accurate common time over the network, as compared to other solutions on the market.

Note that a sync node such as 122 in FIG. 2 will preferably monitor and calculate time and metrics for all incoming VPs, both VP6 and VP7 from master clock 150 but also VP1 and VP2 which will distribute time from clock source 110 and will chose VP(s) based on calibrated states, calibration profile match and routing and/or link and/or quality metrics as described in the invention.

Figure 3:
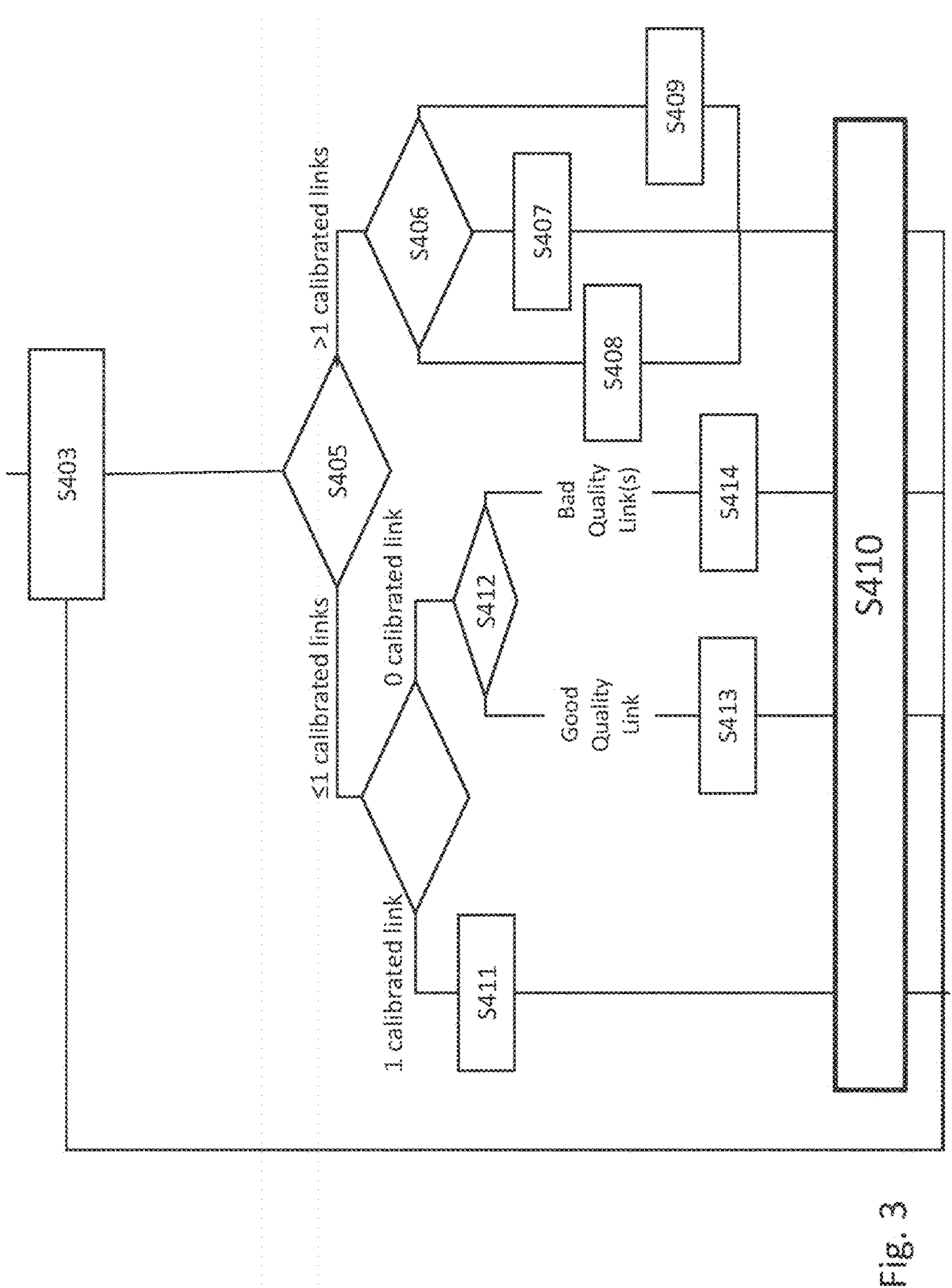
FIG. 3 is a schematic flow chart illustrating embodiments of a method according to the present inventive concept.

FIG. 3 is a schematic flow chart illustrating an embodiment of a method according to the current inventive concept when implemented in an exemplifying network such as network 200 in FIG. 2. Consider sync node 130 which can reach time information from two master clocks 110 and 150 (and optionally reference clock 140) over a number of virtual paths, VP1-VP5.

According to an embodiment of the invention, a method performed in a node such as sync node 130 (or any other selected sync node or a centralized node) typically comprises to continuously monitor two-way time transfer metrics (such as monitoring time stamps, time difference measurements, and correction factors) between nodes involved in two-way time transfer, data stream characteristics, and/or link path properties of connected virtual paths (S403). Sync node 130 performs such continuous monitoring of connected virtual paths VP1, VP2, VP3, VP4 and VP5. The virtual paths may be associated with one or more respective predetermined calibration profiles which typically comprises delay correction factors, i.e. correction factors calculated using two-way time transfer calculations, and optionally other profile data. The calibration profile of a virtual path may include profile data including at least one of: expected round trip time, RTT, packet loss, packet delay variation, PDV, wander, a quality indicator to determine degree of trusted link, link path delay in one or both directions between the sync nodes, and link path delay difference for different directions of data streams between the sync nodes, average delay between the sync nodes, calibration factors indicating the amount of asymmetry in the link path delay in respective opposite directions of the virtual path, and a delay correction factor which represents the correction factor needed to compensate for delay, and in particular any asymmetric delays, over the link paths. To obtain the best accuracy for the asymmetry change detection, using several data stream characteristics is preferable. For example using only RTT would not be sufficient since different LPs can have the same RTT value but with very different asymmetries. The predetermined calibration profiles may be stored (locally and/or centralized).

The at least one data stream characteristics or link property may comprise at least one of: (visible) nodes in the link path, round trip time (RTT), packet loss, packet delay variation (PDV), wander, minimum link path delay in one or both directions between the first node and the second node, i.e. the sync nodes between which the VP is established, maximum link path delay in one or both directions between the first node and the second node, average link path delay between the first node and the second node, calibration factors indicating the amount of asymmetry in the link path delay in respective opposite directions of the virtual path, link path delay difference for directions between the first node and the second node.

Among the connected virtual paths, candidate VPs are identified, e.g. by performing change detection of one or a selected subset of parameters making part of a predetermined calibration profile, verifying quality metrics per link and verifying all uplink sync nodes which are in Calibrated State (e.g. in the case of sync node 130 controlling which of sync nodes 120-122 are in calibrated state). VPs are determined to be within their predetermined calibration profile(s) when the monitored data stream characteristics matches to previously determined values saved in the calibration profile or according to an embodiment matches within a preselected range of the previously determined values saved in the calibration profile, see illustration in FIG. 4 below. In addition, quality measures of the VP of the data stream characteristics are measured and found to have a predetermined value or to be within an acceptable range. While being in a calibrated state, i.e., having at least one matching calibration profile from a VP from a calibrated sync node, the node will communicate this state to neighboring nodes. If the node enters a non-calibrated state, e.g., in state S412 in the figure, the node will immediately update its neighbors of the new state.

While continuously monitoring all incoming VPs in S403, system may detect changes in calibration profile matches and if such a change happens, e.g., an existing selected calibration profile does not match any longer or a new calibration profile match occurs, the system will update with new candidate VPs.

The step of identifying candidate VPs further optionally comprises or is followed by determining if, and if so, how many connected VPs fulfil the criteria to become a candidate VP (S405).

If determining that two or more candidate VPs are identified in step S405 the next step according to the invention is to rank the candidate VPs among themselves (S406). The ranking is performed by at least one of comparing among identified candidate VPs if the respective connected sync node is in calibrated state, best fit or weighted best fit of data stream characteristics of the respective calibration profile, link type or link path properties, master clock source, priority of master clock source, quality metrics of the VPs and/or their combined path to master clock source, sync routing protocol metrics from master clock source, calculated node clock time per VP, and number of link paths to connected sync node or to master clock source. The list of ranking criteria is non exhaustive as other criteria's are conceivable.

In Table 1 the virtual paths VP1-VP5 are ranked on based on a number of criteria: number of link hops/jumps to a nearest master clock, i.e. a clock source node, or optionally to a time reference clock, calibration state of the nearest sync node, selected monitored data stream characteristics/link properties within dynamic range (R1 being in normal range, R2 being in a border range of accepted range, and R3 being outside of accepted range). In Table 1 VP5 is ranked as number 1, i.e. the highest ranked VP which is considered to be a trusted reliable time source since the number of jumps to a master clock is the lowest, the nearest sync node is in calibrated state, the selected monitored Data is within range R1 and thereby determined to fit within the calibration profile. Many different ways of selecting and prioritizing ranking criteria are conceivable.

TABLE 1

Different ranking measures per VP

| VP | Jumps to master clock | Sync node in calibrated state | Monitored Data Within profile | Ranking |
|---|---|---|---|---|
| VP1 | 5 | YES (122) | R2 | 3 |
| VP2 | 5 | YES (122) | R1 | 2 |
| VP3 | 4 | NO (121) | R3 | 4 |
| VP4 | 4 | NO (121) | R3 | 4 |
| VP5 | 2 | YES (110) | R1 | 1 |

From the ranked candidate VPs one or more of preferably the highest ranked candidate VPs are selected to be used in a step (S410) for calculating at least one time offset based on the calibration profiles of the one or more selected VPs. From the calculated at least one time offsets, in an optional further step at least one node clock time of the node 130 is calculated using at least one of the time offsets as a time correction factor.

The time correction factor is thus used to estimate the node clock time. If only one VP is selected, its calculated time offset is used to estimate the node clock time. If two or more VPs are selected, their respective calculated time offsets may be combined to estimate the node clock time.

For instance, the node clock time may be calculated using an average of at least two of the time offsets as a time correction factor or applying weighting factors on the node clock times or the time offsets. Weighting factors may be determined using ranking criteria, such as when ranking based on link type and the incoming selected VP link types are fiber on a first selected VP, e.g. VP1 in FIG. 2, and Internet on a second selected VP, e.g. VP2 in FIG. 2, a larger weighting factor is assigned VP1 than VP2.

Consider again step S406, where candidate VPs are ranked and selected and used in step S410, when calculating at least one time offset based on the calibration profiles of the one or more selected ranked VPs, according to different embodiments of the invention, there are several different options on how to use the ranked candidate VPs to calculate the time offsets.

In a first option, step S406 is followed by step S407, in which a best VP is selected based on the ranking criteria. For instance if determining during ranking that a high priority master clock source is reachable through a specific calibrated VP, e.g. VP5 in FIG. 2, the delay correction factor derived from the calibration profile of VP5 is considered to be highly trusted and is alone used to calculate a time offset in step S410 and optionally a node clock time of the node.

In a second option, step S406 is followed by step S408, in which at least two VPs are selected, and a node clock time is calculated using an average of the at least two calculated corresponding time offsets as a time correction factor. In a third option, S409, weighting factors is applied on the respective VPs when calculating the time offsets and/or on the node clock times.

To continue with reference to FIG. 3, if only one of the connected VPs is determined to be a candidate VP in step S405, in an optional step (S411) the calibration profile of that VP is used in the node to provide a time offset for a common network time estimate in step S410.

According to an embodiment of the method, if determining that the monitored data stream characteristics or link path property do not match to any predetermined calibration profile: the method optionally further comprises determining a new additional calibration profile (S412) based on the at least one data stream characteristics and/or link path property, determining the link quality for which the new calibration profile is based (S413 and S414) and for a good quality e.g. in a case when both the sync nodes are in a calibrated state, the virtual link path can be calibrated using the new calibration profile and a time offset using the new calibration profile is used to provide a time offset for a common network time estimate in step S410. If sync node 130 has been in a calibrated state but finds no new calibrated links (a matching calibration profile over a VP from a calibrated sync node), but if quality over a VP is good, it can go into a frequency holdover state in S413. If the link quality is determined to be poor the link should be allowed to stabilize using timers and holdover before determining a new calibration profile or AUTO CAL (S414), before determining a new calibration profile and a time offset using the new calibration profile for providing a time offset for a common network time estimate (S410).

Calibrating a Node B and the Virtual Path

According to an embodiment of the invention, initially, after a virtual path is established between a Node A and a Node B, Node B is calibrated using a trusted source providing a trusted time information. The trusted source may be a local clock or time received from Node A when the time information is transmitted via a network with very well-known asymmetry or preferably no asymmetries where a delay in both directions over a link path each is exactly RTT/2. Such calibration of Node B either makes the time of Node B to have nominally zero offset with respect to the trusted source or have a known offset with respect to the trusted source, which can be used to compensate the offset in time information received in the data stream. With Node B calibrated, and assuming that Node A is calibrated, a link path between them can be calibrated. When Node A is calibrated, and the virtual path is calibrated, then Node B can recover its calibrated status at required times.

For a situation as in the exemplifying embodiment described with reference to FIG. 1, where there can be multiple virtual paths between e.g. node 130 and node 122, that is VP 1 and VP2, each of these VPs will require a calibration, and thus multiple calibration profiles can be supported for the same path VAB. The node may automatically perform such calibration of each new VP and stores the calibrated time offset or delay correction factor in a corresponding calibration profile consisting of one or several data stream characteristics for that VP. When the system detects a change of the data stream characteristics, it will enter holdover mode of the local clock and search through the stored calibration profiles. If it can find a match to an existing profile with the same data stream characteristics, it will apply the stored delay correction factor (or stored time offset for the link) and start using the new VP to provide the local time (phase and frequency) for the node clock. If it cannot find a match, it will see if it has any other incoming VP, for which it has a calibrated state. If so, it will start using the link time offset of that VP, and start calculating the local time (node clock) using that path. In the case, it cannot find any matching profile for any incoming VP, it will use the local clock in its holdover mode as trusted source and create and store a new calibration profile with a data stream characteristics and corresponding link time offset and applying that for the new VP and using the now calibrated link for providing the node clock. Since the time to calculate a new calibration profile in this way is very short, the node will continue to provide an accurate time.

According to an embodiment, the method comprises determining if the node is in a calibrated state; and communicating its calibrated state to neighboring nodes. The node is in a calibrated state when the node is connected to a calibrated virtual path from a calibrated sync node or is connected to a local trusted source. All virtual paths between two nodes having a state of calibration in calibrated state can be calibrated by calculating a time offset per virtual path based on the respective calibrated time offsets of the nodes and information from each respective path.

According to an embodiment, the method comprises determining if connected sync nodes of VPs are in calibrated state, and determining if the node is in a calibrated state. The node is in a calibrated state when the node is connected to a calibrated virtual path from a calibrated sync node or is connected to a local trusted source.

All virtual paths between two nodes in calibrated state can be calibrated by calculating a time offset per virtual path based on respective calibrated time offsets of the nodes and information from each respective path.

Calibration Factor

In two-way time transfer methods measured individual link delays based on local clocks and the Round-Trip Time (RTT) are utilized for calibrating the local clocks link by link. As previously mentioned, known two-way transfer protocols assume that the link delay is equal to RTT/2. Further, if we define the round trip time in a link path as the sum of a receiver-to-sender-node-delay, herein also referred to as a local-remote-delay, LRD, times a first calibration factor and the sender to receiver node delay, remote to local delay, RDL, times a second calibration factor and if it is determined that there is no asymmetry in the link path, LRD equals RLD, and the calibration factor in each direction is determined to be 0.5 such that LRD=RLD=RTT/2. If on the contrary, it is determined that there is an asymmetry in the link path, the respective calibration factors cLRD and cRLD, in the respective direction LRD and RLD can be described as a fraction of the RTT, such that LRD*cLRD+RLD*CRLD=RTT. Other forms of calibration factor can be realized to achieve the same or similar effect, as known to those so skilled in the art.

Figure 4:
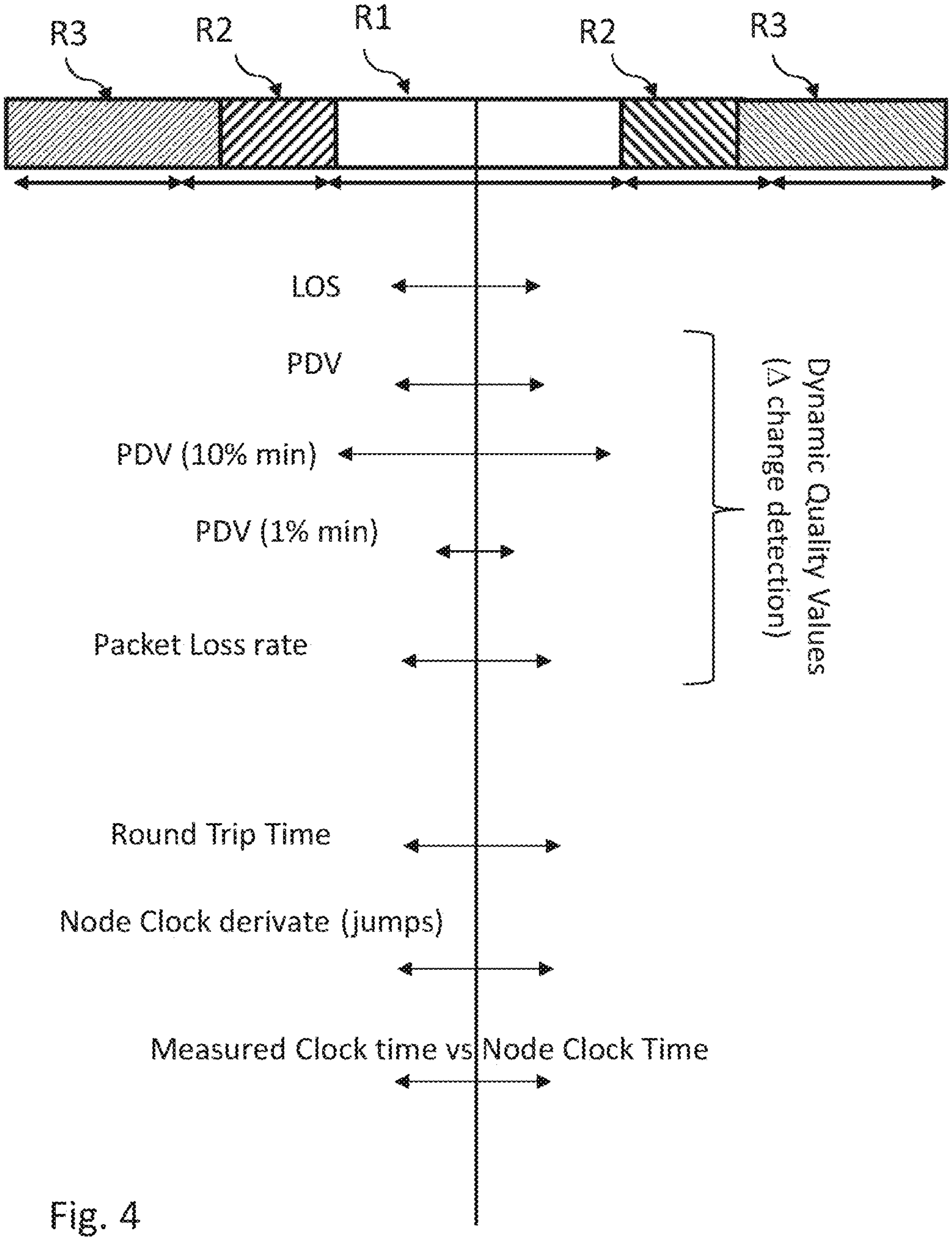
FIG. 4 is a schematic illustration of using dynamic ranges when identifying candidate virtual paths according to an embodiment of the present inventive concept.

FIG. 4 is a schematic illustration of how the embodiments presented herein may use dynamic ranges when monitoring data stream characteristics, QOS measurements, time data such as two-way time transfer metrics, and link path properties of connected virtual paths to identify candidate VPs. The ranges for e.g. PDV can be set to a normal range, R1, to a border range of accepted range, R2, and a range being outside of accepted range, R3. Level of Service (LOS), Packet Delay Deviation (PDV), Packet Loss rate, Round Trip Time, Node Clock derivate (jumps), Measured Clock Time vs. Node Clock time, number of sync hops (#sync hops) number of VPs from Source Clock (#VPs), number of LPs from Source Clock (#LPs), #Type of links, and Probing. Dynamic Quality Values such as LOS, PDV, and Packet Loss rate may advantageously be utilized for change detection monitoring of data stream characteristics as a step of determining if a certain calibration profile of a monitored VP no longer is trustworthy as the monitored data stream characteristics no longer match to the calibration profile, and which calibration profile should therefore be exchanged for another calibration profile. FIG. 4 only gives one example and embodiment of the invention and of course the invention works for a preferred single metrics and the ranges can be set to zero, i.e. using fixed values.

The methods herein are directed to providing node-to-node transmission of data and time synchronization. The methods may be implemented as a distributed or centralized time synchronization over such communication network. For sake of providing an exemplifying embodiment, the method is described as performed in a node in the network surrounded by neighboring nodes and connected to sync nodes over a multiple of VPs.

The invention claimed is:

1. A method for compensating asymmetric link delays for network time estimates in a communication network comprising a first sync node having a plurality of virtual paths (VPs) said plurality of VPs being end-to-end paths connecting said first sync node to one or more second sync nodes, wherein at least two VPs of said plurality of VPs are associated with respective calibration profiles including respective delay correction factors, and data stream characteristics values and/or at least one link path property value, said method comprising:

monitoring data stream characteristics and/or at least one link path property of at least one VP;

identifying, among said at least two VPs, a plurality of candidate VPs having respective calibration profiles which match the monitored data stream characteristics and/or at least one link path property;

selecting, as one or more selected VPs, one or more candidate VPs from among the plurality of candidate VPs by ranking said plurality of candidate VPs; and calculating one or more time offsets based on the respective delay correction factor included in the respective calibration profile of each selected VP of the one or more selected VPs.

2. A method according to claim 1, further comprising:

determining if connected second sync nodes of VPs are in a calibrated state, and determining if said first sync node is in a calibrated state.

3. A method according to claim 2, wherein said determining if said first sync node is in a calibrated state comprises identifying if a connected second sync node of at least one selected VP is in a calibrated state and determining that said at least one selected VP is in a calibrated state.

4. A method according to claim 2, further comprising communicating calibrated state of said first sync node to neighboring nodes.

5. A method according to claim 3, further comprising communicating calibrated state of said first sync node to neighboring nodes.

6. A method according to claim 1, wherein said identifying of the plurality of candidate VPs comprises determining if respective data stream characteristics and/or link path properties of said at least two VPs match to their respective calibration profiles.

7. A method according to claim 1, wherein said identifying of the plurality of candidate VPs comprises determining if respective data stream characteristics and/or link path properties of said at least two VPs match their respective calibration profiles within a preset range.

8. A method according to claim 1, wherein said ranking of the plurality of candidate VPs is performed by at least one of comparing among the plurality of candidate VPs:

if a respective connected second sync node is in a calibrated state, best fit or weighted best fit of data stream characteristics of the respective calibration profile, link type or link path properties, master clock source, priority of master clock source, quality metrics of said VPs and/or their combined path to master clock source, sync routing protocol metrics from master clock source, calculated node clock time per VP, and number of link paths to connected sync node or to master clock source;

wherein link paths are paths between intermediate nodes in the VP.

9. A method according to claim 1, further comprising calculating at least one node clock time by using at least one time offset of said one or more time offsets as a time correction factor.

10. A method according to claim 9, wherein said at least one node clock time is calculated using an average of at least two of said one or more time offsets as the time correction factor.

11. A method according to claim 9, further comprising applying weighting factors on said at least one node clock time or said one or more time offsets.

12. A method according to claim 10, further comprising applying weighting factors on said at least one node clock time or said one or more time offsets.

13. A method according to claim 11, wherein said weighting factors are determined using said ranking of the plurality of candidate VPs.

14. A method according to claim 8, wherein, when ranking based on the link type, the link type is one of fiber, wavelength, Ethernet, IP/MPLS, radio link, OAS, and Internet.

15. A method according to claim 1, wherein said calibration profiles are identified in a list of predetermined calibration profiles by monitoring and comparing at least one monitored data stream characteristic and/or at least one link path property to corresponding values of respective predetermined calibration profiles among the list of predetermined calibration profiles.

16. A method according to claim 1, wherein the method is performed in said first sync node, a connected second sync node, a central node in communication with sync nodes of the communication network, or are distributed among said first sync node, said connected second sync node, and the central node.

17. A central node in a communication system comprising a multiple of nodes, wherein the central node is arranged in communication with said nodes, said central node comprising a memory and a processor configured for providing a central protocol for performing the method according to claim 1.

18. A node in a communication system arranged for node to node communication, the node comprising: a memory storing computer-readable instructions, and a processor configured to execute the computer-readable instructions to perform the method according to claim 1.

19. A non-transitory computer readable storage medium storing computer-readable instructions executable by a processor to cause the processor to perform the method according to claim 1.

* * * * *